United States Patent
Marathe et al.

(10) Patent No.: US 8,352,799 B2
(45) Date of Patent: Jan. 8, 2013

(54) DATA CORRUPTION PREVENTION DURING APPLICATION RESTART AND RECOVERY

(75) Inventors: Shailesh Vaman Marathe, Pune (IN); Amol Shivram Katkar, Pune (IN); Viraj Rajan Kamat, Pune (IN)

(73) Assignee: Symantec Corporation, Mountain View, CA (US)

( * ) Notice: Subject to any disclaimer, the term of this patent is extended or adjusted under 35 U.S.C. 154(b) by 47 days.

(21) Appl. No.: 12/705,559

(22) Filed: Feb. 12, 2010

(65) Prior Publication Data

US 2011/0202795 A1 Aug. 18, 2011

(51) Int. Cl.
*G06F 11/00* (2006.01)
(52) U.S. Cl. ............ 714/38.1; 714/4.11; 714/4.12; 714/4.3; 714/5.11; 714/15
(58) Field of Classification Search ............ 714/4.11, 714/4.12, 4.3, 5.11, 15, 38.1
See application file for complete search history.

(56) References Cited

U.S. PATENT DOCUMENTS

| | | | |
|---|---|---|---|
| 6,327,243 B1 * | 12/2001 | Gregorat ................ 370/218 |
| 7,080,221 B1 * | 7/2006 | Todd et al. ............ 711/161 |
| 7,080,225 B1 * | 7/2006 | Todd ..................... 711/165 |
| 7,093,088 B1 * | 8/2006 | Todd et al. ............ 711/162 |
| 7,257,811 B2 * | 8/2007 | Hunt et al. ............. 718/1 |
| 7,263,590 B1 * | 8/2007 | Todd et al. ............ 711/165 |
| 7,376,764 B1 * | 5/2008 | Todd ..................... 710/38 |
| 7,415,591 B1 * | 8/2008 | Todd et al. ............ 711/170 |
| 7,536,525 B2 * | 5/2009 | Chandrasekaran et al. .. 711/165 |
| 7,653,833 B1 * | 1/2010 | Miller et al. ........... 714/13 |
| 7,681,075 B2 * | 3/2010 | Havemose et al. ..... 714/15 |
| 7,783,914 B1 * | 8/2010 | Havemose .............. 714/4.11 |
| 7,793,287 B2 * | 9/2010 | Lowell .................. 718/1 |
| 7,805,583 B1 * | 9/2010 | Todd et al. ............ 711/162 |
| 7,840,963 B2 * | 11/2010 | Traut .................... 718/1 |
| 7,849,286 B2 * | 12/2010 | Sugumar et al. ....... 711/173 |
| 7,925,923 B1 * | 4/2011 | Hyser et al. ........... 714/13 |
| 7,962,672 B1 * | 6/2011 | Martin et al. .......... 710/38 |
| 2005/0108593 A1 * | 5/2005 | Purushothaman et al. ..... 714/4 |
| 2006/0212671 A1 * | 9/2006 | Todd ..................... 711/165 |
| 2007/0174658 A1 * | 7/2007 | Takamoto et al. ...... 714/4 |
| 2008/0104606 A1 * | 5/2008 | Boutcher et al. ...... 718/104 |
| 2008/0126834 A1 * | 5/2008 | Sankaran et al. ...... 714/4 |
| 2008/0147887 A1 * | 6/2008 | Freimuth et al. ...... 710/1 |
| 2008/0147943 A1 * | 6/2008 | Freimuth et al. ...... 710/240 |
| 2010/0037089 A1 * | 2/2010 | Krishnan et al. ...... 714/5 |
| 2010/0050011 A1 * | 2/2010 | Takamoto et al. ...... 714/4 |
| 2010/0058108 A1 * | 3/2010 | Nammatsu et al. ..... 714/4 |
| 2010/0083250 A1 * | 4/2010 | Nakai ................... 718/1 |
| 2010/0125845 A1 * | 5/2010 | Sugumar et al. ....... 718/1 |
| 2011/0126047 A1 * | 5/2011 | Anderson et al. ...... 714/15 |

* cited by examiner

*Primary Examiner* — Joshua P Lottich

(57) ABSTRACT

Embodiments of the present invention are directed to a method and system for draining or aborting IO requests of a failed system prior to restarting or recovering an application in virtual environments. The method includes detecting, within an electronic system, an application error condition of an application executing on a virtual machine and determining an application restart target. The method further includes sending an input/output (IO) request drain command to a virtual IO server operable to provide storage to the virtual machine and receiving a signal that the IO requests have been drained. The drain command is operable to drain IO requests issued from the application. The application can then be restarted or recovered.

17 Claims, 8 Drawing Sheets

600

Creating A Virtual Initiator For A Virtual Machine To Access A Portion Of
A Storage Exported By A Storage Array
602

Setting A Mapping Of A Virtual Initiator And A Corresponding Physical
Initiator For The Virtual Machine
604

Receiving Registration From An Application Management Component Of
The Virtual Machine
606

Sending Input/Output (IO) Requests From The Virtual Machine Via Said
Mapping Of The Virtual Initiator
608

Detecting An Application Error Condition
610

Sending A Preempt And Abort Command To A Storage Array
612

Fig. 6

DATA CORRUPTION PREVENTION DURING APPLICATION RESTART AND RECOVERY

TECHNICAL FIELD

Embodiments of the present invention generally relate to digital computer systems and digital storage.

BACKGROUND

As technology advances, data storage is increasingly important and data storage capacities are increasing rapidly. Correspondingly, the size of data storage arrays and their demands for storage have increased rapidly. Ever increasing amounts of data are required to be highly available and protected from corruption or damage that may be caused by any of a variety of factors, such as natural disasters and power failures, etc. As a result, increasingly complex data storage clusters are used to satisfy the demands for data storage and retrieval.

Similarly, virtualization of computers and/or operating systems has become increasingly important to enable server consolidation such that many small physical servers can be replaced by one larger physical server. This results in increased and more efficient utilization of costly hardware resources such as central processing units (CPU), thereby allowing power savings and hardware cost savings.

Virtual environments typically include virtualized computers and/or operating systems known as virtual machines which require access to storage. Access to storage is provided by virtual input/output (I/O) servers which virtualize the physical storage. Applications running on the virtual machines use the storage provided by the virtual IO servers to hand requests and perform various functions.

In response to an application error or failure, application data can get corrupt during an application restart or recovery in a variety of situations. If I/O requests initiated by an application that has failed are not drained or completed before a new application instance starts issuing IO requests, data corruption may occur. In particular, virtual environments make such a situation more difficult to deal with as the virtual IO server adds an additional layer of virtualization to the storage, thereby removing the possibility of identifying and filtering out IO requests from the virtual machine running the application that has died or hung.

Thus, a need exists to handle incomplete IO requests in virtual environments prior to restarting or recovering an application.

SUMMARY OF THE INVENTION

Accordingly, embodiments of the present invention provide systems and methods for draining or aborting IO requests issued from an application that is in error prior to restarting or recovering an application in virtual environments. The draining or aborting of IO requests prevent data corruption that these pending IO requests would likely cause.

In one embodiment, the present invention is implemented as a method for application recovery. The method includes detecting, within an electronic system, an application error condition (e.g., hang or crash of an application or a virtual machine) of an application executing on a virtual machine and determining an application restart target. The method further includes sending an input/output (IO) request "drain command" to a virtual IO server operable to provide storage to the virtual machine and receiving a signal that the IO requests have been drained. The drain command is operable to drain IO requests issued from the application. The application can then be restarted or recovered. The application can be restarted on the same virtual machine or another virtual machine which may have access to storage via the same virtual IO server or another virtual IO server.

In one embodiment, the present invention is implemented as a computer readable storage medium having stored thereon, computer executable instructions that, if executed by a computer system cause the computer system to perform a method including detecting, within an electronic system, an application error condition (e.g., hang or crash of an application or a virtual machine) of an application executing on a virtual machine and determining an application restart target. The method further includes sending an input/output (IO) request "drain command" to a virtual IO server operable to provide storage to the virtual machine and receiving a signal that the IO requests have been drained. The drain command is operable to drain IO requests issued from the application. The application can then be restarted or recovered. The application can be restarted on the same virtual machine or another virtual machine which may have access to storage via the same virtual IO server or another virtual IO server.

In yet another embodiment, the present invention is implemented as a storage cluster system comprising a computer system having one or more processors coupled to a computer readable storage media and executing computer readable code which causes the computer system to implement a process including detecting, within an electronic system, an application error condition (e.g., hang or crash of an application or a virtual machine) of an application executing on a virtual machine and determining an application restart target. The method further includes sending an input/output (IO) request "drain command" to a virtual IO server operable to provide storage to the virtual machine and receiving a signal that the IO requests have been drained. The drain command is operable to drain IO requests issued from the application. The application can then be restarted or recovered. The application can be restarted on the same virtual machine or another virtual machine which may have access to storage via the same virtual IO server or another virtual IO server.

BRIEF DESCRIPTION OF THE DRAWINGS

FIG. 6 shows an exemplary flowchart of processes for restarting an application within an environment using NPIV, in accordance with embodiments of the present invention.

DETAILED DESCRIPTION

Figure 1:
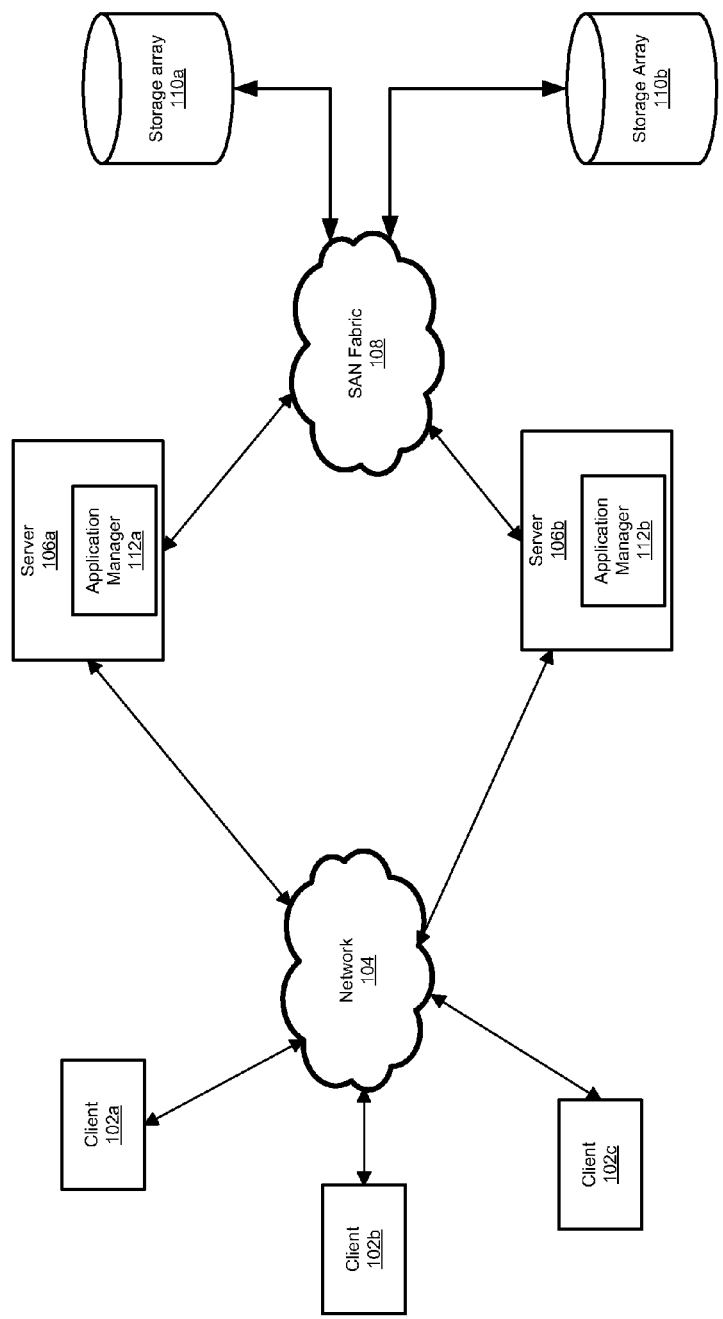
FIG. 1 shows a block diagram of an exemplary operating environment, in accordance with one embodiment of the present invention.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "deactivating," "disabling," "freezing," "re-activating," "enabling," "thawing," "sending," "determining," "flushing," "responding," "generating," "making," "blocking," "accessing," "taking a snapshot," "associating," "allowing," "updating," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Exemplary Operating Environment

FIG. 1 shows a block diagram of an exemplary operating environment, in accordance with one embodiment of the present invention. Exemplary operating environment 100 includes clients 102a-c, networks 104, servers 106a-b, storage area network (SAN) fabric 108, and storage arrays 110a-b. It is appreciated that that components of exemplary operating environment 100 are exemplary and more or fewer components may be present in various configurations. It is appreciated that operating environment may be part of a distributed computing environment, a cloud computing environment, a client server environment, etc.

Client systems 102a-c access information on storage arrays 110a-b via servers 106a-b using, for example, a web browser or other suitable client communication software (not shown). FIG. 1 depicts the use of a network 104 such as the Internet for exchanging data, but the present disclosure is not limited to the Internet or any particular network-based environment.

Each of servers 106a-b can have multiple clients (e.g., clients 102a-c) connected thereto. Servers 106a-b can be a variety of server types including, but not limited to, database servers, network file system (NFS) servers, and application servers (e.g., billing). For example, applications and servers might have thousands of people accessing them from different locations, thus the applications and servers need to be highly available and the cluster fault tolerant. In some embodiments, servers 106a-b have access to shared storage of storage arrays 110a-b with each of servers 106a-b having its own respective clustered file system and its own built-in lock manager thereby allowing servers 106a-b to access the shared storage. Each of servers 106a-b may communicate with each other over a network (e.g., a redundant private network) (not shown). Servers 106a-b may be linked to storage arrays 110a-b in a variety of ways including, fibre channel.

Servers 106a-b respectively execute application managers 112a-b which manage applications using storage of storage arrays 110a-b. In one embodiment, application managers 112a-b operate via virtualization layer of servers 106a-b and an application managers 112a-b manage IO requests issued by the applications have been detected as having an error condition (e.g., crash or hang). For example, application managers 112a-b ensure that IO requests from an application that has crashed are drained before the application is restarted.

Figure 2:
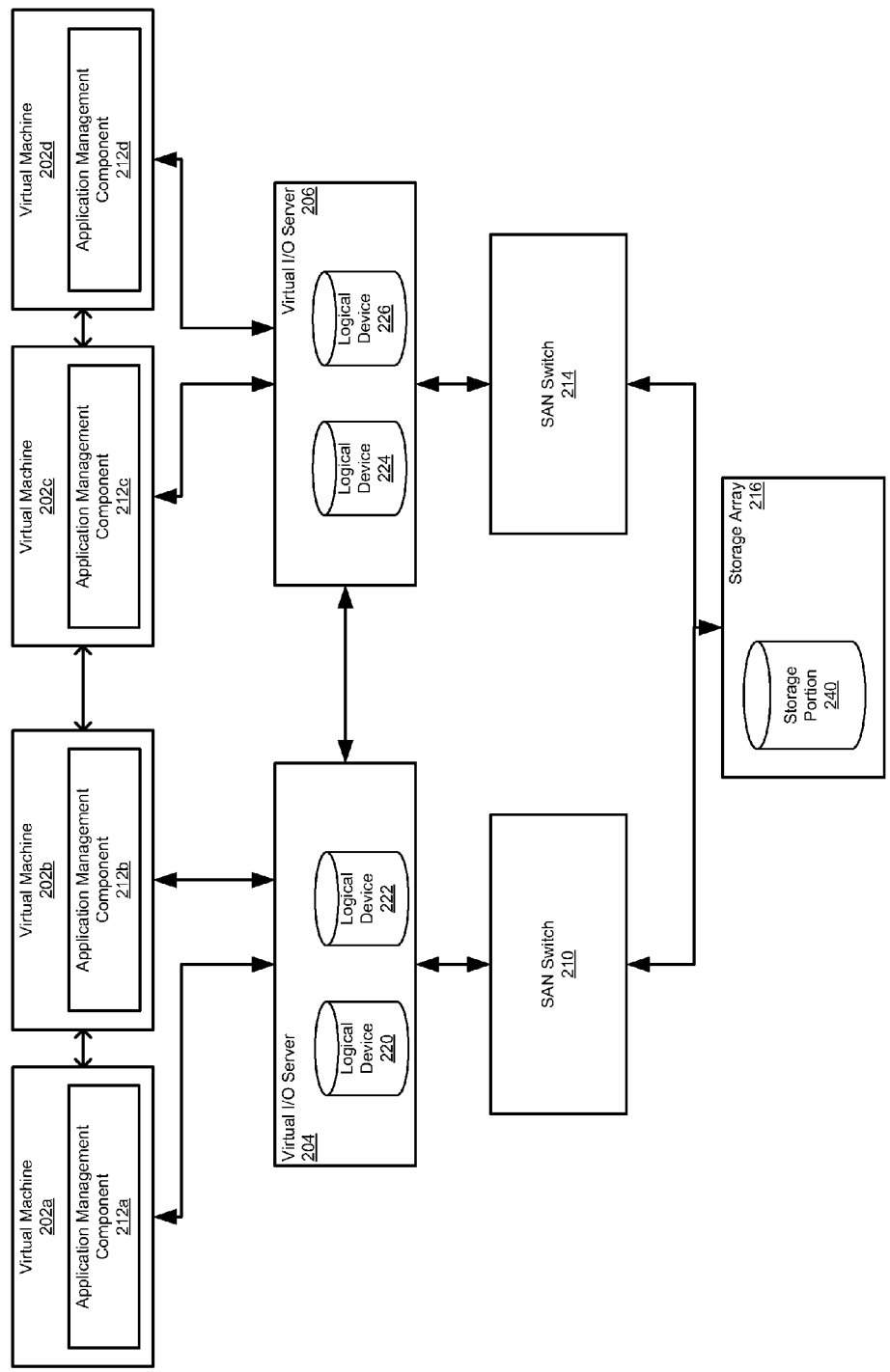
FIG. 2 shows a block diagram of another exemplary operating environment, in accordance with one embodiment of the present invention.

FIG. 2 shows a block diagram of another exemplary operating environment, in accordance with one embodiment of the present invention. Exemplary operating environment 200 includes virtual machines 202a-d, virtual I/O servers 204-206, storage area network (SAN) switches 210-214, and storage array 216. Virtual machines 202a-d include application management components 212a-d, respectively. Embodiments of the present invention are operable to support application restart and recovery where multiple virtual storage devices are exported, by a virtual storage layer, from a single storage portion (e.g., logical unit number (LUN)) exported by a storage array. It is appreciated that in situations where multiple virtual machines are accessing a SAN or other storage though a single physical initiator, attempting to deny access to a single virtual machine would deny access to each virtual machine using the same physical initiator.

Storage array 216 exports storage portion 240 (e.g., a LUN) to virtual IO servers 204-206. SAN switches 210-214 communicatively couple virtual IO serves 204-206 to storage array 216. Virtual I/O servers 204-206 provide virtual machines 202a-d access to storage array 216.

Virtual IO server 204-206 form storage virtual layer operable to subdivide exported devices (e.g., storage portion 240) and support a variety of access types by virtual machines 202a-d (e.g., striping across multiple logical devices). Virtual IO servers 204-206 may form a storage cluster for access by virtual machines 202a-d. In one embodiment, virtual I/O server 204 exports logical device 220 to virtual machine 202a and exports logical device 222 to virtual machine 202b. Virtual I/O server 206 can export logical device 224 to virtual machine 202c and export logical device 226 to virtual machine 202d. It is appreciated that multiple logical devices may be exported from a single storage unit.

Each of virtual machines 202a-d execute application management components 212a-d, respectively. Application management components 212a-d monitor virtual machines 202a-d and monitor applications executing on virtual machines 202a-d. Application management components 212a-d further determine application restart or recovery targets for applications running on virtual machines 202a-d. Application management components 212a-d are operable to support application failover of highly available applications. Application management components 212a-d can form a cluster to communicate coordinate applications restarts and recoveries with each other. Communication among application management components 212a-d allows each of application management components 212a-d to determine when there is an application error condition (e.g., hang or crash) or a machine error condition (e.g., virtual machine hang or crash). Application management components 212a-d is further operable track which application is using particular set of virtual devices (e.g., logical device 220). When a particular virtual machine or application is either hung or crashed, application management component determines whether to migrate a particular virtual machine or failover the application to one of the other virtual machines.

Application management components 212a-d are further operable to prevent data corruption by ensuring that IO requests from a failed application or virtual machine which are still pending (e.g., in the layers of an IO server, switches, or other part of a SAN) are drained or completed and further IO requests from that virtual machine are blocked. If an application was restarted without draining pending IO requests, the restarted application could issue IO requests that would be processed along with old IO requests thereby leading to uncoordinated IO actions and data corruption. Blocking IO requests while pending IO requests are drained, ensures that when the application or virtual machine reenters an operational state, any further IO requests issued are prevented from corrupting data.

In one embodiment, virtual IO servers 204-206 each have a counter for each exported device (e.g., logical devices 220-226) that tracks how many IO requests have been issued and which IO requests are outstanding. During draining of IO requests, virtual servers 204-206 can block additional IO requests for a particular virtual device while waiting for the counter of outstanding IO requests to reach zero.

Application management components 212a-d are operable to restart an application on the same virtual machine or physical machine. For example, application management component 212a detects an application error condition of an application running on virtual machine 202a and initiates a process to restart the application on virtual machine 202a. In order to deal with the IO requests issued prior to the application error condition, application management component 212a can signal virtual IO server 204 to drain any pending IO requests from virtual machine 202a. Drain means that IO requests that were issued, but not completed, prior to application error are allowed to complete. After the IO requests pending for virtual machine 202a have completed, virtual IO server 204 can signal application management component 212a that the IO requests from virtual machine 202a have completed. Application management component 212a can then restart the application on virtual machine 202a.

Application management components 212a-d are further operable to restart an application on a different virtual machine being provided storage by the same virtual IO server or a different virtual machine being provided storage by a different virtual IO server. For example, application management components 212b and 212c may detect that an application running on virtual machine 202a has crashed or hung and determine that the application should be restarted on virtual machine 202b or virtual machine 202c.

In the case where application management component 212b determines that the application is to be restarted on virtual machine 202b, application management component 212b signals virtual IO server 204 to drain any IO requests remaining from virtual machine 202a for logical device 220 and block any further IO requests for virtual machine 202a. Virtual IO server 204 may signal virtual IO server 206 that access to logical devices 222 is to be stopped. As a result, IO requests received for logical device 220 will be denied. In one embodiment, application management component 212b may also panic virtual machine 202a. IO server 204 signals application management component 212b when the pending IO requests from virtual machine 202a have completed. Application management component 212b then starts the application on virtual machine 202b.

In the case where application management component 212c determines that the application is to be restarted on virtual machine 202c, application management component 212c signals virtual IO server 206 to drain any IO requests remaining from virtual machine 202a for logical device 220 and block any further IO request from virtual machine 202a. Virtual IO server 206 signals virtual IO server 204 to drain any IO requests remaining from virtual machine 202a for logical device 220 and block any further IO requests from virtual machine 202a. In one embodiment, application management component 212c may panic virtual machine 202a. After the IO requests from virtual machine 202a have been drained, virtual IO server 204 signals virtual IO server 206 that the IO requests have been drained. Virtual IO server 206 then signals application management component 212c that the IO requests have been drained. Application management component 212c then starts the application on virtual machine 202c.

Application management components 212a-d are further operable to drain IO requests not drained after a virtual machine migration. For example, when a virtual machine is migrated from one physical computing system to another physical computing system, application management components 212a-d signal for pending IO requests to be completed before new application IO requests are resumed.

Application management components 212a-d are also operable to facilitate draining IO requests prior to application recovery on surviving nodes (e.g., virtual machines 202b-d) for parallel applications. It is noted that parallel applications share a set of virtual storage devices (e.g., logical devices 220-226). For example, where a clustered application is running on virtual machines 402a-d and an application error condition of the application instance of virtual machine 202a is detected by application management components 212b-d, application management components 212b-d will signal virtual IO servers 204-206 to drain any remaining IO requests from virtual machine 202a. After the pending IO requests from virtual machine 202a are drained, virtual IO servers 204-206 signal application management components 212b-d that the remaining IO requests have been drained and recovery of the application on remaining virtual machines 202b-d can begin.

Figure 3:
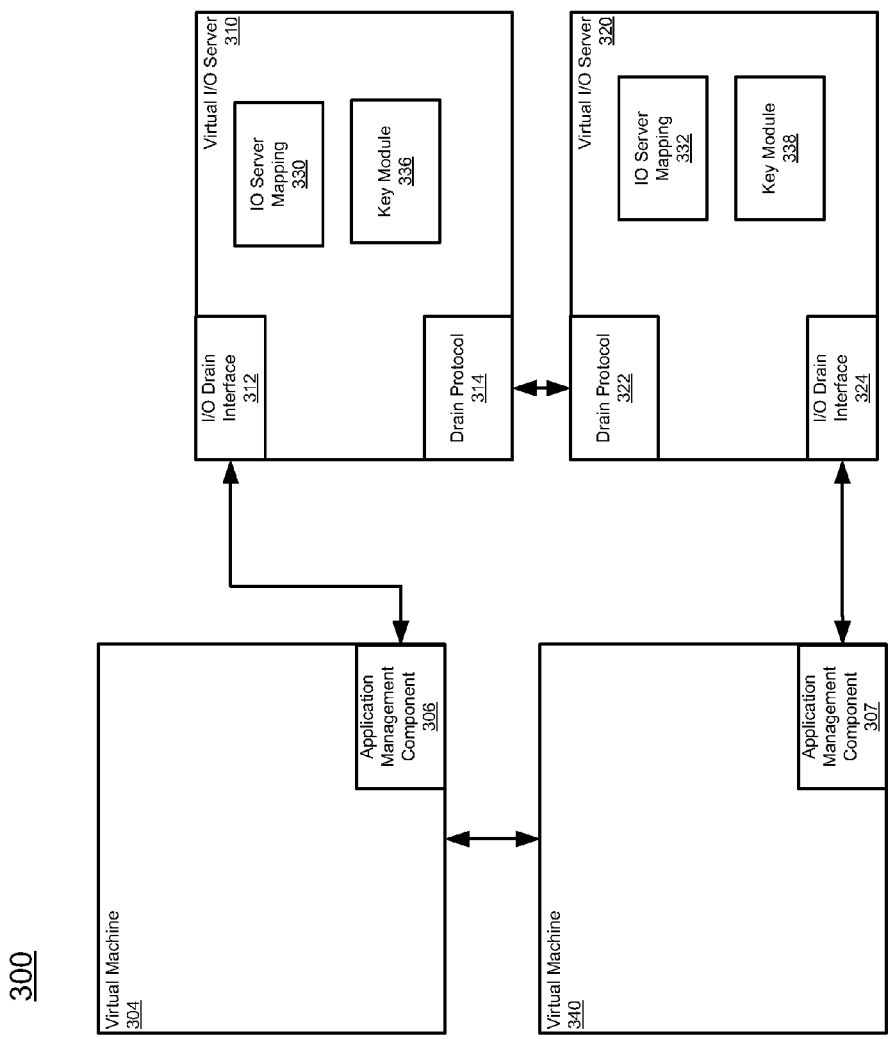
FIG. 3 shows a block diagram of exemplary components of a virtual machine and a virtual I/O server, in accordance with one embodiment of the present invention.

FIG. 3 shows a block diagram of exemplary components of a virtual machine and a virtual I/O server, in accordance with one embodiment of the present invention. Exemplary components of diagram 300 include virtual machines 304-340 and virtual IO servers 310-320. Virtual IO Server 310 includes I/O drain interface 312, IO server mapping module 330, key module 336, and drain protocol 314. Virtual IO server 320 includes drain protocol 322, I/O drain interface 324, IO server mapping module 332, and key module 338.

Virtual machine 304 includes application management component 306 operable to facilitate draining of IO requests prior to application recovery or restart. Virtual machine 340 includes application management component 307 operable to facilitate draining of IO request prior to application recovery or restart. Upon detecting an application or virtual machine error condition (e.g., crash or hang), application management component 306 signals virtual IO server 310 via IO drain interface 312. Upon detecting an application or virtual machine error condition (e.g., crash or hang), application management component 307 signals virtual IO server 320 via IO drain interface 324. I/O drain interfaces 312-324 are operable for use in triggering I/O request draining operations for a given set of devices or volumes (e.g., logical devices 220-226). Draining of IO requests can be achieved by draining the outstanding IO requests or aborting the outstanding IO requests, or a combination thereof and blocking subsequent IO requests.

In one embodiment, timeouts can be used to handle situations where some IO requests are not able to complete (e.g., hang). In such a scenario, the application management component can avoid restarting the application. It is appreciated this would be acceptable since restarting the application could otherwise have led to data corruption.

In one embodiment, drain protocol modules 314-322 are operable to globally signal each virtual IO server in a cluster of virtual IO servers upon which pending IO requests are to be drained and to block IO requests until the IO requests are drained. Drain protocol modules 314-322 form a cluster wide protocol in a storage access layer in the I/O domain (e.g., cluster volume manager (CVM) or volume manager) to drain I/O request on a given set of devices or volumes.

In one embodiment, IO server mapping modules 330-332 are operable to store a mapping of each virtual machine and each virtual IO server. The mapping may further include information of which virtual devices (e.g., logical devices 220-226) have been exported by which IO server. The mapping allows an IO server to communicate with the appropriate IO server which exports the device being used by the application or virtual machine that has the error condition. In such situations, clusterwide signaling would not be necessary. For example, IO mapping module 330 stores a mapping indicating that logical device 220 is exported to virtual machine 202a by virtual IO server 320. IO server 310 would then signal virtual IO server 320 directly via drain protocol modules 314-322 to drain any pending IO requests on virtual server 320 from virtual machine 202a for logical device 220.

In another embodiment, key modules 336-338 are used to drain IO requests from particular virtual machines. Key modules 336-338 may keep cluster wide key mappings of virtual IO servers and corresponding virtual devices (e.g., logical devices 220-226) and virtual machines. Each virtual machine may register with a unique key for each virtual device exported by a virtual IO server (e.g., logical devices 220-226). The virtual I/O server would allow access to a virtual device from a virtual machine only if the virtual machine has registered for that virtual device. For example, after virtual machine 304 has registered with a unique key through application management component 306, IO server 310 will allow IO requests from virtual machine 304 to any virtual device (e.g., logical devices 220-226) that has the unique key registered from virtual machine 304.

Virtual IO servers 310-320 are operable to use key mappings of key mapping modules 336-338 to signal a virtual IO server operable to provide storage to a virtual machine with an application or virtual machine error condition. For example, application management component 307 signals IO server 320 upon detecting an application error condition on virtual machine 304. Upon signaling from application management component 307, IO server 320 would then signal virtual IO server 310, based on key mappings in key module 338, via drain protocol modules 314-322 to drain any pending IO requests and deny further IO requests on IO server 310 from virtual machine 304 to any virtual device (e.g., logical devices 220-226) that has the unique key registered from virtual machine 304.

In one embodiment, application management components 306 and 307 are operable to send an IO request drain command for virtual devices with a particular key. Upon receiving the IO request drain command, drain protocol modules 314 and 322 identify virtual devices for IO draining and the virtual IO server exporting the virtual devices based on key mappings of key modules 336-338. In another embodiment, application management components 306 and 307 are operable to send an IO request drain command for a particular set of virtual devices with a particular key. Upon receiving the IO request drain command, drain protocol modules 314 and 322 use the key mappings of key modules 336-338 to identify virtual IO servers exporting the virtual devices of the particular set of virtual devices.

Figure 4:
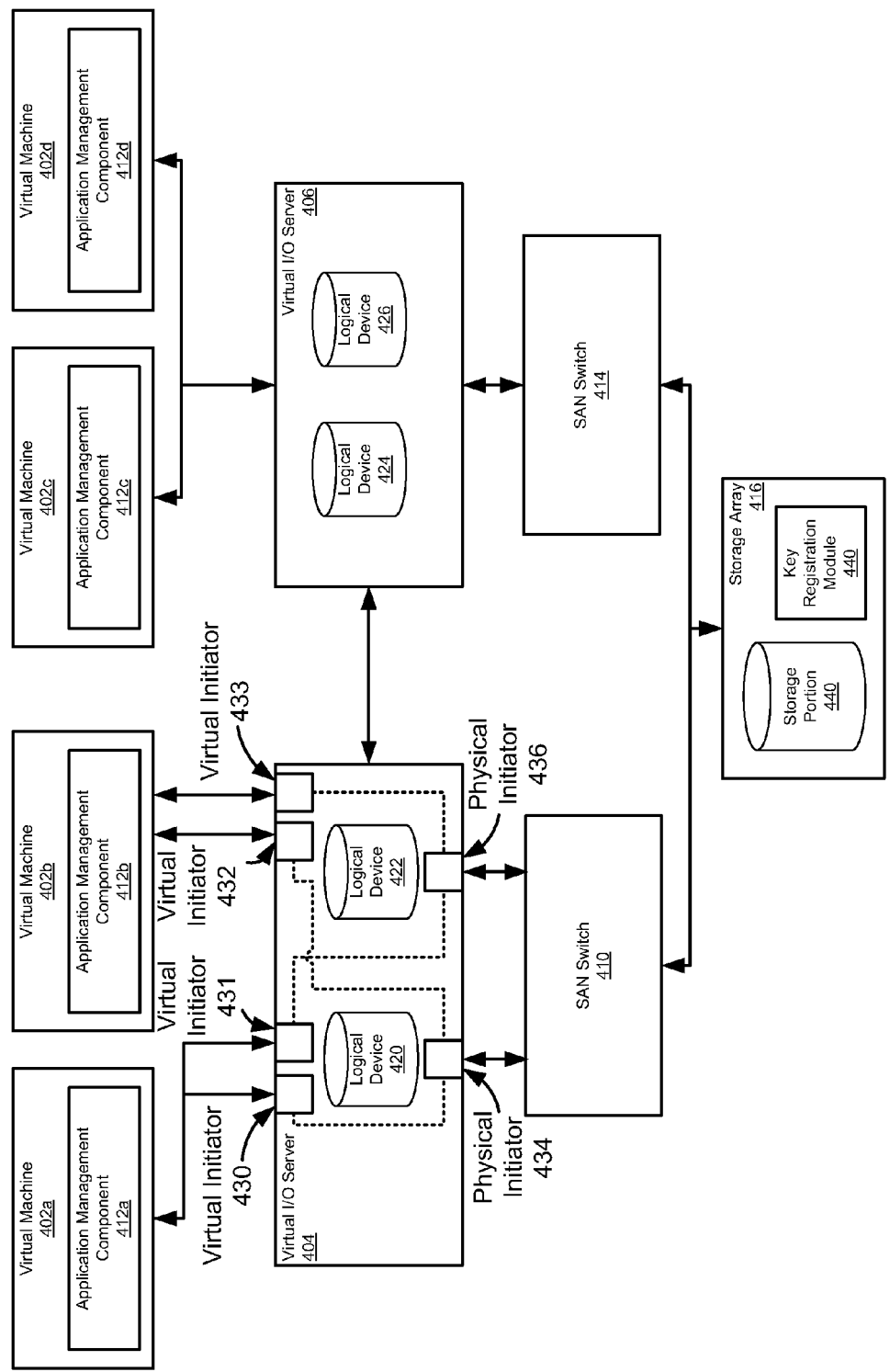
FIG. 4 shows a block diagram of an exemplary virtual environment where N_port (node port) identifier virtualization (NPIV) is used, in accordance with another embodiment of the present invention.

FIG. 4 shows a block diagram of an exemplary virtual environment where N_port (node port) identifier virtualization (NPIV) is used, in accordance with another embodiment of the present invention. The exemplary operating environment 400 includes virtual machines 402a-d, virtual I/O servers 404-406, SAN switches 410-414, and storage array 416. Virtual machines 402a-d include application management components 412a-d, respectively. Embodiments of the present invention are operable to support application restart and recovery where multiple virtual storage devices are exported, by a virtual storage layer, from a single storage portion (e.g., logical unit number (LUN)) exported by a storage array.

Storage array 416 exports storage portion 440 (e.g., a LUN) to virtual IO servers 404-406. SAN switches 410-414 communicatively couple virtual IO serves 404-406 to storage array 416. Virtual I/O servers 404-406 provide virtual machines 402a-d access to storage array 416.

Virtual IO server 404-406 form storage virtual layer operable to subdivide exported devices (e.g., storage portion 440) and support a variety of access types by virtual machines 402a-d (e.g., striping across multiple logical devices). Virtual IO servers 404-406 may form a storage cluster for access by virtual machines 402a-d. In one embodiment, virtual I/O server 404 exports logical device 420 to virtual machine 402a and exports logical device 422 to virtual machine 402b. Virtual I/O server 406 can export logical device 424 to virtual machine 402c and export logical device 426 to virtual machine 402d.

Virtual IO server 404 includes virtual initiators 430-432 and physical initiators 434-436. In one embodiment, virtual initiators 430-432 are NPIV ports for virtual IO server 404. Virtual initiator 430 is used to communicatively couple virtual machine 402a and virtual IO server 404. Virtual initiator 432 communicatively couples virtual machine 402b to virtual IO server 404. Embodiments of the present invention utilize separate NPIV ports for each virtual machine.

According to this embodiment, virtual IO server 404 maps and accordingly sends IO requests received from virtual machine 402a via virtual initiators 430-431 through physical initiators 434-436. Virtual IO server 404 maps and accordingly sends IO requests received from virtual machine 402b via virtual initiators 432-433 through physical initiators 434-436. Virtual initiators 430 and 432 are coupled (e.g., communicatively) with physical initiator 434. Virtual initiators 431 and 433 are coupled (e.g., communicatively) with physical initiator 436. For example, where physical initiators 434 and 436 are represented as H1 and H2, respectively, and virtual machines 402a and 402b are represented as V1 and V2, respectively, IO server 404 may map virtual initiators 430 and 431 to physical initiators H1 and H2 as VH1V1 and VH2V1 and map virtual initiators 432 and 433 to physical initiators H1 and H2 as VH1V2 and VH2V2.

In one embodiment, virtual initiator 430 is used for IO requests from virtual machine 402a for logical device 420 and virtual initiator 431 is used for IO requests from virtual machine 402a for logical device 422. Virtual initiator 432 is used for IO requests from virtual machine 402b for logical device 420 and virtual initiator 433 is used for IO requests from virtual machine 402b for logical device 422.

Application management components 412a-b register keys per virtual initiator for virtual machines 402a-b with key registration module 440 of storage array 416. Key registration module 440 stores a mapping of virtual initiators and virtual machine keys. For example, application management component 402 registers a unique key for virtual machine 402a (e.g., V1 key) for virtual initiators 430 (e.g., VH1V1) and 431 (e.g., VH2V1) and application management component 412b registers a unique key for virtual machine 402b (e.g., V2 key) for virtual initiators 432 (e.g., VH1V2) and 433 (e.g., VH2V2). Key registrations may be performed for each storage portion 440 (e.g., LUN) exported by storage array 440.

When application management components 412a-d detect a virtual machine or application error condition, virtual IO servers 404-406 may issue a "preempt and abort command" (e.g., small computer system interface (SCSI) 3 preempt and abort command) to storage array for a specific key. For example, if virtual IO server 404 issued a preempt and abort command to storage array 416 for the key corresponding to virtual machine 402a (e.g., V1 key). Storage array 416 would then remove or delete registrations (e.g., for VH1V1 and VH2V1) with the key for virtual machine 402a (e.g., V1 key). Any IO requests received from virtual machine 402a would be sent via virtual initiators 430-431 (e.g., VH1V1 and VH2V1) and be denied upon reaching storage array 416. Storage array 416 would also remove any pending IO requests for virtual machine 402a in an IO queue.

Figure 5:
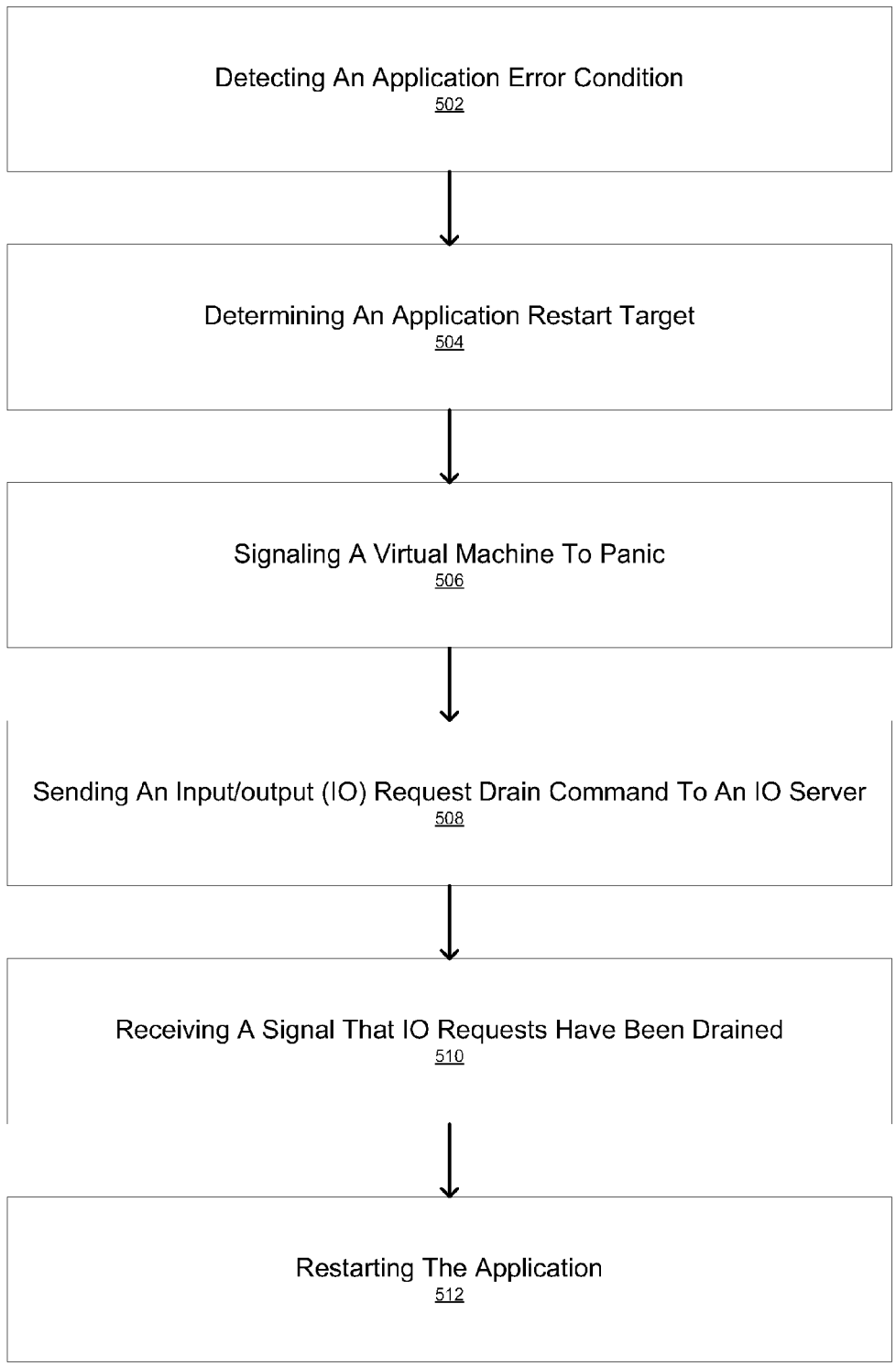
FIG. 5 shows an exemplary flowchart of processes for restarting an application, in accordance with embodiments of the present invention.

With reference to FIGS. 5 and 6, exemplary flowcharts 500 and 600 illustrate example processes used by various embodiments of the present invention. Although specific blocks are disclosed in flowcharts 500 and 600, such blocks are exemplary. That is, embodiments are well suited to performing various other blocks or variations of the blocks recited in flowcharts 500 and 600. It is appreciated that the blocks in flowcharts 500 and 600 may be performed in an order different than presented, and that not all of the blocks in flowcharts 500 and 600 may be performed. Flowcharts 500 and 600 include processes that, in various embodiments, are carried out by a processor under the control of computer-readable and computer-executable instructions. Embodiments of the present invention may thus be stored as computer readable media or computer-executable instructions including, but not limited to, a firmware update, software update package, or hardware (e.g., ROM).

FIG. 5 shows an exemplary flowchart of processes for restarting an application, in accordance with embodiments of the present invention. Process 500 may be carried out by an application management component (e.g., application management components 402a-d). Embodiments of the present invention are operable to function with any clusterized form of storage management.

At block 502, an application error condition is detected, via an electronic system, of an application executing on a first virtual machine or, migration is to occur. As described herein, an application error condition can be an application that has hung or crashed or a virtual machine similar error.

At block 504, an application restart target is determined. As described herein, an application restart target may be a variety of devices including another virtual machine using the same or a different IO server and the same virtual machine.

At block 506, a virtual machine with the application error condition may be signaled to panic (e.g., via IO fencing). As described herein, an application management component may signal a virtual machine to panic to prevent data corruption.

At block 508, an input/output (IO) request drain command is sent to an IO server operable to provide storage to the virtual machine. As described herein, an application management component may send a request to a virtual IO server to drain IO requests for a particular virtual machine. In one embodiment, the request to drain IO requests may be sent globally to each virtual IO server. In another embodiment, the request to drain IO requests is sent from the virtual IO server receiving the request is sent to the virtual IO server handling IO requests for the virtual machine based on a mapping of virtual machines and virtual IO servers.

At block 510, a signal that IO requests have been drained is received. As described herein, an application management component may receive a signal that IO requests have been drained from a virtual IO server.

At block 512, the application is restarted. As described herein, an application management component may restart the application on an application restart target (e.g., virtual machine 402*c*).

FIG. 6 shows an exemplary flowchart of processes for restarting an application within an environment using NPIV, in accordance with embodiments of the present invention.

At block 602, a virtual initiator is created for a virtual machine to access a portion of a storage exported by a storage array.

At block 604, a mapping of a virtual initiator for the virtual machine is set. As described herein, virtual initiator may be mapped (e.g., statically) to a corresponding physical initiator for IO requests from a virtual machine.

At block 606, a registration from an application management component of the virtual machine is received. As described herein, the application management component may register a unique key for virtual machine on each virtual initiator with a storage array (e.g., storage array 416). At block 608, an IO request from virtual machine is sent via the mapping for the virtual initiator.

At block 610, an application error condition is detected. As described herein, the application error condition may be detected by an application management component.

At block 612, a preempt and abort command is sent to a storage array. As described herein, a virtual IO server may issue a preempt and abort command to a storage array to abort pending IO requests and deny future requests from a particular virtual machine.

Figure 7:
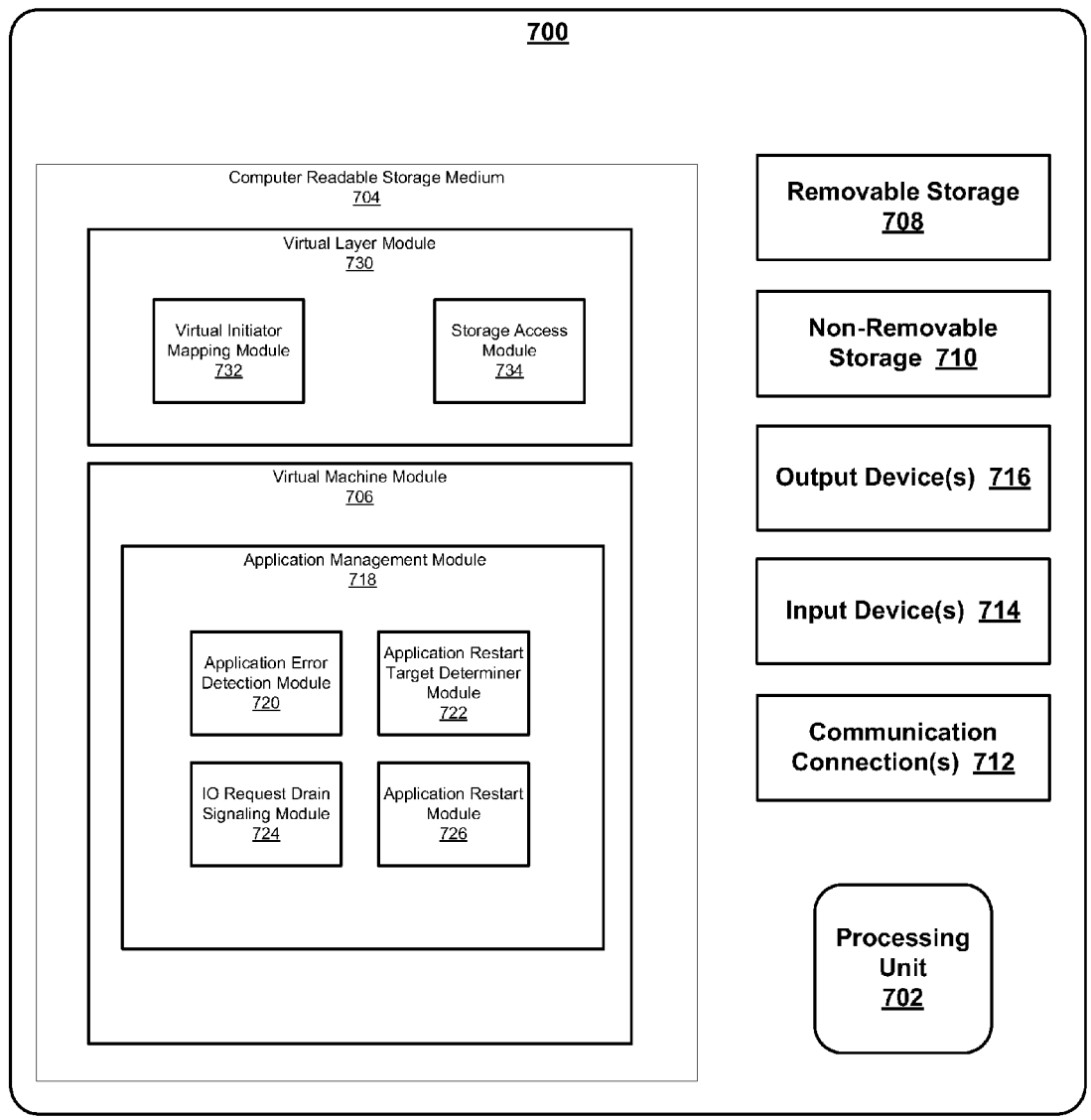
FIG. 7 shows a block diagram of an exemplary computer system, in accordance with one embodiment of the present invention.

FIG. 7 shows a block diagram of an exemplary computer system module 700, in accordance with one embodiment of the present invention. With reference to FIG. 7, an exemplary system module for implementing embodiments includes a general purpose computing system environment, such as computing system environment 700. Computing system environment 700 may include, but is not limited to, servers (e.g., servers 106*a-b*), desktop computers, laptops, tablet PCs, mobile devices, and smartphones. In its most basic configuration, computing system environment 700 typically includes at least one processing unit 702 and computer readable storage medium 704. Depending on the exact configuration and type of computing system environment, computer readable storage medium 704 may be volatile (such as RAM), non-volatile (such as ROM, flash memory, etc.) or some combination of the two. Portions of computer readable storage medium 704 when executed facilitate draining or aborting of IO requests prior to application restart or recovery (e.g., processes 500 and 600).

Additionally, computing system environment 700 may also have additional features/functionality. For example, computing system environment 700 may also include additional storage (removable and/or non-removable) including, but not limited to, magnetic or optical disks or tape. Such additional storage is illustrated in FIG. 10 by removable storage 708 and non-removable storage 710. Computer storage media includes volatile and nonvolatile, removable and non-removable media implemented in any method or technology for storage of information such as computer readable instructions, data structures, program modules or other data. Computer readable medium 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 700. Any such computer storage media may be part of computing system environment 700.

Computing system environment 700 may also contain communications connection(s) 712 that allow it to communicate with other devices. Communications connection(s) 712 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 712 may allow computing system environment 700 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 712 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 700 may also have input device(s) 714 such as a keyboard, mouse, pen, voice input device, touch input device, remote control, etc. Output device(s) 716 such as a display, speakers, etc. may also be included. All these devices are well known in the art and are not discussed at length.

In one embodiment, computer readable storage medium 704 includes virtual layer module 730 and virtual machine module 706 which includes application management module 718.

Virtual layer module 730 includes virtual initiator mapping module 732 and storage access module 734. Storage access module 734 provides virtual machine module access to storage. Virtual initiator mapping module 732 maintains a mapping of IO requests from virtual machines (e.g. virtual machine module 706) to virtual initiators (e.g., virtual initiators 430-431).

Application management module 718 includes application error detection module 720, application restart target determiner module 722, IO request drain signaling module, and application restart module 726. Application management module 718 is operable to facilitate IO requests being drained or aborted prior to application restart or recovery. Application error detection module 720 is operable to detect application and virtual machine error conditions (e.g., crash or hang). Application restart target determiner 722 is operable to determine an application restart target (e.g., the same virtual machine or another virtual machine). IO request drain signaling module 724 is operable to signal a virtual IO server that IO requests from a particular virtual machine need to be drained. Application restart module 726 is operable to restart an application on an application restart target.

Figure 8:
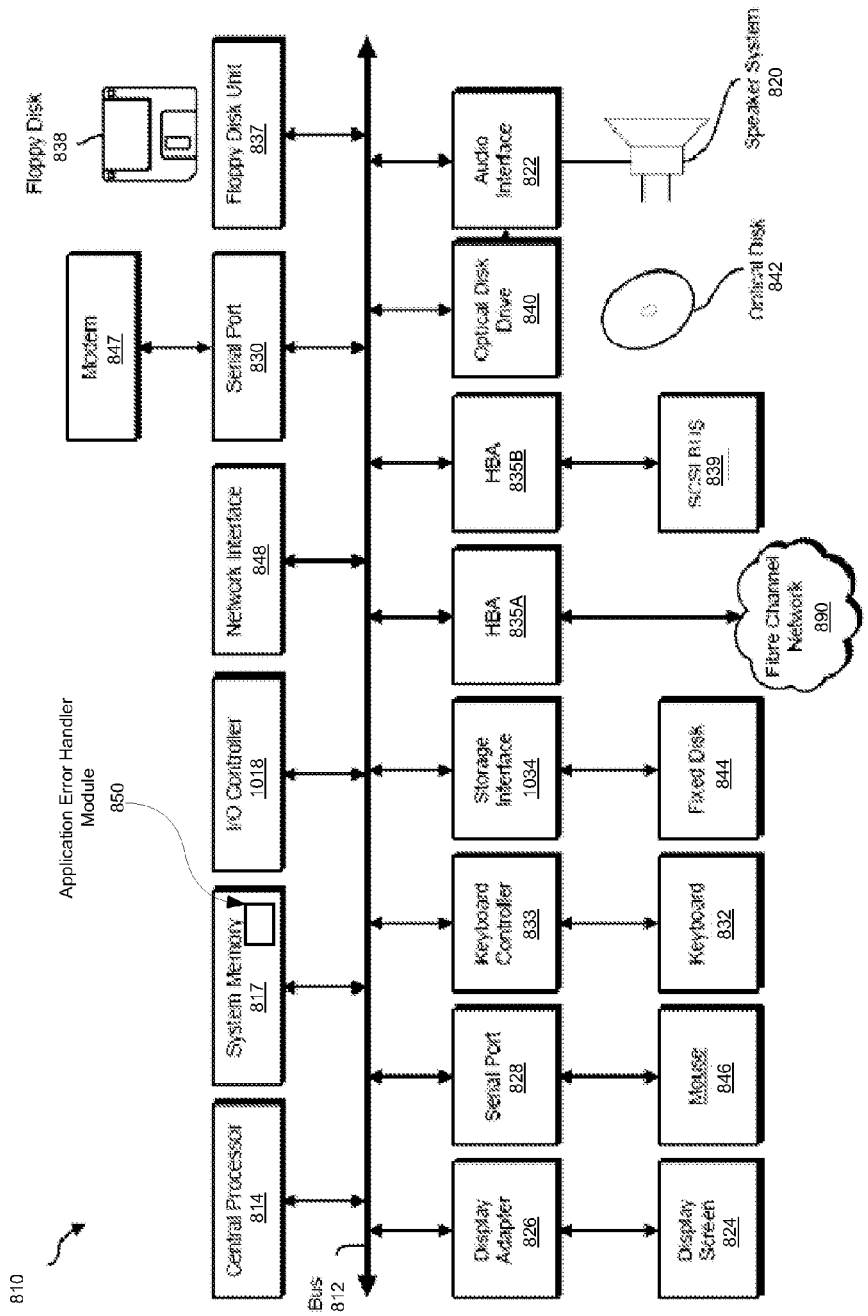
FIG. 8 shows a block diagram of another exemplary computer system, in accordance with one embodiment of the present invention.

FIG. 8 shows a block diagram of another exemplary computer system, in accordance with one embodiment of the present invention. FIG. 8 depicts a block diagram of a computer system 810 suitable for implementing the present disclosure. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812). System memory 817 includes application error handle module 850 which is operable to facilitate IO requests being drained or aborted prior to application restart or recovery.

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. The operation of a computer system such as that shown in FIG. 8 is readily known in the art and is not discussed in detail in this application. Code to implement the present disclosure can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Thus, embodiments of the present invention provide a mechanism and method to drain or complete outstanding IO operations before a new instance of an application is started. The restart/recovery of the application can be on the same node (e.g., virtual machine) or on a different node (e.g., another virtual server when fail-over is performed).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of application recovery comprising:
   detecting, within an electronic system, an application error condition of an application executing on a virtual machine;
   determining an application restart target;
   sending an input/output (IO) request drain command to a first virtual IO server, wherein said drain command is operable to drain IO requests issued from said application, and wherein said IO request drain command is sent globally to each virtual IO server of a virtual IO server cluster;

receiving a signal that said IO requests have been drained; and restarting said application on said restart target.

2. The method of claim 1 further comprising:

signaling said virtual machine with said application error condition to panic.

3. The method of claim 1 wherein said application error condition is at least one of an application hang, an application crash, a hanging of said virtual machine, and a crash of said virtual machine.

4. The method of claim 1 wherein said first virtual IO server is operable to store a mapping for each of a plurality of virtual machines and each corresponding virtual IO server of a plurality of virtual IO servers and said first virtual IO server is operable to use said mapping to send said IO request drain command to a second virtual IO server operable to provide storage to said virtual machine.

5. The method of claim 1 wherein said first virtual IO server is operable to store a key mapping with a unique key for each of a plurality of virtual machines and each corresponding virtual device exported by said first virtual IO server and said first virtual IO server is operable to use said mapping to send said IO request drain command to a second virtual IO server operable to provide storage to said virtual machine.

6. The method of claim 1 wherein said first virtual IO server is operable to perform a method comprising:

creating a virtual initiator for said virtual machine to access a portion of storage exported by a storage array;

setting a mapping of a virtual initiator and a corresponding physical initiator for said virtual machine; and sending said IO requests from said virtual machine via said mapping.

7. A non-transitory computer readable storage medium having stored thereon, computer executable instructions that, if executed by a computer system cause the computer system to perform a method of providing storage information comprising:

detecting, within an electronic system, an application error condition of an application executing on a virtual machine;

determining an application restart target;

sending an input/output (IO) request drain command to a first virtual IO server, wherein said drain command is operable to drain IO requests issued from said application, and wherein said IO request drain command is sent globally to each virtual IO server of a virtual IO server cluster;

receiving a signal that said IO requests have been drained; and restarting said application on said restart target.

8. The computer readable storage medium of claim 7, wherein said method further comprises:

signaling said virtual machine with said application error condition to panic.

9. The computer readable storage medium of claim 7, wherein said application error condition is at least one of an application hang, an application crash, a hanging of said virtual machine, and a crash of said virtual machine.

10. The computer readable storage medium of claim 7, wherein said first virtual IO server is operable to store a mapping of for each of a plurality of virtual machines and each corresponding virtual IO server of a plurality of virtual IO servers and said first virtual IO server is operable to use said mapping to send said IO request drain command to a second virtual IO server operable to provide storage to said virtual machine.

11. The computer readable storage medium of claim 7, wherein said first virtual IO server is operable to store a key mapping with a unique key for each of a plurality of virtual machines and each corresponding virtual device exported by said first virtual IO server and said first virtual IO server is operable to use said mapping to send said IO request drain command to a second virtual IO server operable to provide storage to said virtual machine.

12. The computer readable storage medium of claim 7, wherein said first virtual IO server is operable to perform a method comprising:

creating a virtual initiator for said virtual machine to access a portion of storage exported by a storage array;

setting a mapping of a virtual initiator and a corresponding physical initiator for said virtual machine; and sending said IO requests from said virtual machine via said mapping.

13. A storage cluster system, comprising:

a computer system comprising one or more processors coupled to a computer readable storage media and configurable to execute computer readable code stored on the computer readable storage media which causes the computer system to implement a method comprising:

detecting, within an electronic system, an application error condition of an application executing on a virtual machine;

determining an application restart target;

sending an input/output (IO) request drain command to a first virtual IO server, wherein said drain command is operable to drain IO requests issued from said application, and wherein said IO request drain command is sent globally to each virtual IO server of a virtual IO server cluster;

receiving a signal that said IO requests have been drained; and restarting said application on said restart target.

14. The storage cluster system of claim 13, wherein said method further comprises:

signaling said virtual machine with said application error condition to panic.

15. The storage cluster system of claim 13 wherein said application error condition is at least one of an application hang, an application crash, a hanging of said virtual machine, and a crash of said virtual machine.

16. The storage cluster system of claim 13 wherein said first virtual IO server is operable to store a mapping for each of a plurality of virtual machines and each corresponding virtual IO server of a plurality of virtual IO servers and said first virtual IO server is operable to use said mapping to send said IO request drain command to a second virtual IO server operable to provide storage to said virtual machine.

17. The storage cluster system of claim 13 wherein said first virtual IO server is operable to store a key mapping with a unique key for each of a plurality of virtual machines and each corresponding virtual device exported by said first virtual IO server and said first virtual IO server is operable to use said mapping to send said IO request drain command to a second virtual IO server operable to provide storage to said virtual machine.

* * * * *